United States Patent [19]

Kawachi et al.

[11] Patent Number: 5,292,690
[45] Date of Patent: Mar. 8, 1994

[54] GLASS COMPOSITION FOR GLASS BUBBLES WITH INCREASED COMPRESSIVE STRENGTH

[75] Inventors: Shinji Kawachi; Yoshifumi Sato, both of Shiga, Japan

[73] Assignee: Nippon Electric Glass Company, Ltd., Shiga, Japan

[21] Appl. No.: 858,345

[22] Filed: Mar. 26, 1992

[30] Foreign Application Priority Data

Mar. 29, 1991 [JP] Japan .................................. 3-93273

[51] Int. Cl.$^5$ ............................................. C03C 3/078
[52] U.S. Cl. .......................................... 501/33; 501/63; 501/65; 501/66; 501/67; 501/68; 501/69; 501/72
[58] Field of Search ..................... 801/33, 63, 65, 66, 801/67, 72, 69, 68

[56] References Cited

U.S. PATENT DOCUMENTS

| | | | |
|---|---|---|---|
| 4,243,421 | 1/1981 | Kume | 501/72 |
| 4,391,646 | 7/1983 | Howell | 501/33 |
| 4,661,137 | 4/1987 | Garnier | 501/33 |
| 4,983,550 | 1/1991 | Goetz et al. | 501/33 |

FOREIGN PATENT DOCUMENTS

| | | | |
|---|---|---|---|
| 614357 | 2/1961 | Canada | 501/68 |
| 251967 | 12/1987 | Fed. Rep. of Germany | C03C 3/93 |

OTHER PUBLICATIONS

Genda Zairyo Rikigaku (Modern Strength of Materials) pp. 201-202 1970.
Japanese Industrial Standard JIS R1602 (cited p. 7) 1986 ed.
Japanese Industrial Standard JIS R3502 (cited on p. 7) 1987 ed.

Primary Examiner—Mark L. Bell
Assistant Examiner—C. M. Bonner
Attorney, Agent, or Firm—Collard & Roe

[57] ABSTRACT

A glass composition for glass bubbles used as reinforcing fillers in plastic resin articles has an improved compressive strength and the reduced alkali amount leached from the glass. The glass composition consists essentially of, by weight percentages, $SiO_2$ 40-59%, $R_2O$ 2-17%, $R_2O$ being at least one selected from $Li_2O$, $Na_2O$, and $K_2O$, $B_2O_3$ 1-25%, RO 5-25%, RO being at least one selected from CaO, MgO, BaO, ZnO, and SrO, $RO_2$ 6-40%, $RO_2$ being at least one selected from $TiO_2$ and $ZrO_2$, $Al_2O_3$ 0-13%, $P_2O_5$ 0-3%, and $SO_3$ 0.1-1.0%.

2 Claims, No Drawings 5,292,690

GLASS COMPOSITION FOR GLASS BUBBLES WITH INCREASED COMPRESSIVE STRENGTH

BACKGROUND OF THE INVENTION

The present invention relates to glass bubbles for use in fillers for plastic resin articles and, in particular, to glass compositions for those glass bubbles.

Glass bubbles or hollow glass spheres have been used as fillers in plastic resin articles so as to reinforce the articles with decrease of weight. Those glass bubbles are desired to have high compressive strength, collapse strength, or crushing strength so as to avoid being crushed or broken during injection molding or press molding of the articles. Further, glass bubbles are required to have high adhesive strength for plastic resin so as to reinforce the plastic resin articles.

U.S. Pat. Nos. 4,391,646 and 4,983,550 disclose those glass bubbles. Although the known glass bubbles disclosed in the U.S. Patents have compressive strength improved, they are still insufficient in the compressive strength and have tendency to be broken during molding of the plastic resin articles.

Further, the known glass bubbles are not good in water resistance. In detail, alkali is leached from the glass bubbles so that the adhesive strength is not sufficient for the plastic resin.

SUMMARY OF THE INVENTION

It is an object of the present invention to provide a glass composition for glass bubbles used as filler in plastic resin articles which are excellent in compressive strength and adhesive strength.

According to the present invention, a glass composition for glass bubbles used as reinforcing fillers in plastic resin articles is obtained which consists essentially of, by weight percentages, $SiO_2$ 40-59%, $R_2O$ 2-17%, $R_2O$ being at least one selected from $Li_2O$, $Na_2O$, and $K_2O$, $B_2O_3$ 1-25%, RO 5-25%, RO being at least one selected from CaO, MgO, BaO, ZnO, and SrO, $RO_2$ 6-40%, $RO_2$ being at least one selected from $TiO_2$ and $ZrO_2$, $Al_2O_3$ 0-13%, $P_2O_5$ 0-3%, and $SO_3$ 0.1-1.0%.

According to a preferable aspect of the present invention, a glass composition for glass bubbles used as reinforcing fillers in plastic resin articles consists essentially of, by weight percentages, $SiO_2$, 42-58%, $R_2O$ 3-16%, $R_2O$ being at least one selected from $Li_2O$, $Na_2O$, and $K_2O$, $B_2O_3$ 3-23%, RO 6-22%, RO being at least one selected from CaO, MgO, BaO, ZnO, and SrO, $RO_2$ 7-26%, $RO_2$ being at least one selected from $TiO_2$ and $ZrO_2$, $Al_2O_3$ 0-11%, $P_2O_5$ 0-2%, and $SO_3$ 0.2-0.8%.

In the glass composition, $RO_2$ is preferably 10-26%.

According to the present invention, glass bubbles having diameters of 1-130 micrometers and wall thickness of 0.5-20 micrometers can be obtained. The glass bubbles consist essentially of, by weight percentages, $SiO_2$ 40-59%, $R_2O$ 2-17%, $R_2O$ being at least one selected from $Li_2O$, $Na_2O$, and $K_2O$, $B_2O_3$ 1-25%, RO 5-25%, RO being at least one selected from CaO, MgO, BaO, ZnO, and SrO, $RO_2$ 6-40%, $RO_2$ being at least one selected from $TiO_2$ and $ZrO_2$, $Al_2O_3$ 0-13%, $P_2O_5$ 0-3%, and $SO_3$ 0.1-1.0%.

DESCRIPTION OF THE INVENTION

The compressive strength P of the individual glass bubble is represented by Equation (10.58) in Gendai Zairyo Rikigaku (Modern Strength of Materials), page 202. The equation is:

$$P = 4Et^2/3r^2 \sqrt{(7 - v)/5(23 - v)(1 - v^2)} .$$

In the equation, E is a Young's modulus for the glass of the bubbles, t is a wall thickness of the bubble, r is a radius of the bubble, and $v$ is a Poisson's ratio for the glass. It is seen from the equation that compressive strength of bubbles is determined by Young's modulus and Poisson's ratio of the glass under a condition when the wall thickness and the radius of the glass bubble are constant. Since Poisson's ratio of glass is generally constant, it is understood that the compressive strength of glass bubbles is substantially dependent on Young's modulus of the glass. Accordingly, the present inventors use Young's modulus of glass as an index of the compressive strength of glass bubbles.

The following conditions are required for producing glass bubbles. It is required in the melting process that meltability is excellent without devitrification and gâll nondissolved in the molten glass, because heterogeneous glass considerably lowers the compressive strength of glass bubbles. Further, it is required in reheating process for expanding glass particles into bubbles that gas is generated at an amount appropriate to form bubbles without explosion.

As conditions required to the glass bubbles other than the producing conditions, the high compressive strength, that is, the high Young's modulus as the index thereof is needed and it is also necessary that alkali is little leached from the glass.

The glass composition of the glass bubbles according to the present invention comprises glass forming ingredients appropriately selected with amounts thereof being restricted in the specified ranges. In particular, the glass composition contains, as essential elements, $TiO_2$ and $ZrO_2$ which serves to reduce the amount of alkali leached from the glass and to improve the Young's modulus of the glass, so that the glass composition fulfils the conditions for the glass bubbles and production thereof as described above.

Now, description will be made as to reasons why amounts of ingredients are restricted as described above.

$SiO_2$ is an element for a network former of the glass. Amount of $SiO_2$ is 40-59 wt. %. Use of $SiO_2$ less than 40 wt. % disadvantageously increases the alkali amount leached from the glass, while more than 59 wt. % degrades the meltability of the glass. Preferably, the amount of $SiO_2$ is 42 wt. % to 58 wt. %.

$R_2O$ is at least one selected from $Li_2O$, $Na_2O$, and $K_2O$ and is a melting element for the glass. $R_2O$ amount is 2-17 wt. %. Less than 2 wt. % degrades the meltability of the glass and more than 17 wt. % disadvantageously increases the alkali amount leached from the glass. $R_2O$ is preferably 3 wt. % to 16 wt. % in amount.

$B_2O_3$ amount is 1-25 wt. %. If the amount is less than 1 wt. %, the meltability of the glass is disadvantageously lowered and alkali is considerably leached from the glass. Use of more than 25 wt. % lowers the compressive strength of the glass bubbles. A preferable amount of $B_2O_3$ is 3-23 wt. % and an especially preferred amount of $B_2O_3$ is 3.5-23 wt. %.

RO is at least one of CaO, MgO, ZnO, and SrO and is 5-25 wt. % in amount. RO less than 5 wt. % degrades the meltability of the glass and more than 25 wt. % causes devitrification of the glass. Preferably, the amount of RO is 6–22 wt. %.

$RO_2$ is at least one selected from $TiO_2$ and $ZrO_2$ and is 6–40 wt. % in amount. $RO_2$ less than 6 wt. % undesirably lowers the compressive strength of glass bubbles and increases alkali amount leached from the glass. Use of $RO_2$ more than 40 wt. % degrades the meltability of the glass and causes devitrification of the glass. The preferable amount of $RO_2$ is 7–26 wt. % and more preferably, 10–26 wt. %.

$Al_2O_3$ is an optional element and is added in the glass by an amount up to 13 wt. %. An amount of $Al_2O_3$ tends to degrades the meltability of the glass. Therefore, the amount is limited 13 wt. % or preferably 11 wt. % at the maximum.

$P_2O_5$ is an optional element for promoting $SO_3$ to dissolve into the glass. However, since an amount of $P_2O_5$ tends to generate the gâll nondissolving in the glass, the amount should be limited 3 wt. % preferably 2 wt. % at the maximum.

$SO_3$ is a blowing agent for generating $SO_2$ gas to form glass bubbles and is contained 0.1–1 wt. % in the glass. When the amount is less than 0.1 wt. %, the glass bubbles cannot be formed. However, use of $SO_3$ more than 1 wt. % generates the gâll nondissolved in the molten glass. The preferable amount of $SO_3$ is 0.2–0.8 wt. %.

The collected glass bubbles have a diameter of 1–130 micrometers and a wall thickness of 0.5–20 micrometers.

EXAMPLES

Samples 1–17 in the Table are ones according to the present invention and samples A and B are comparative samples which are known ones disclosed in U.S. Pat. Nos. 4,983,550 and 4,391,646, respectively.

The table contains Young's modulus of each sample glass and alkali amount leached from the glass sample.

From comparison of the samples 1–17 with known samples A and B, it is understood that samples according to the present invention is superior to the known samples in Young's modulus and alkali amount leached from the glass.

The Young's modulus and the leached alkali amount were measured according to a test for dynamic modulus of elasticity by a pulse echo overlap method prescribed in JIS (Japanese Industrial Standard) R 1602 and an alkali leach test prescribed in JIS R 3502, respectively.

According to the method described above, glass bubbles were produced by use of sample glasses. Thus, the obtained glass bubbles were measured to have diameters of 1–130 micrometers and wall thickness of 0.5–20 micrometers.

| Sample No. | 1 | 2 | 3 | 4 | 5 | 6 | 7 | 8 | 9 | 10 | 11 | 12 | 13 | 14 | 15 | 16 | 17 | A | B |
|---|---|---|---|---|---|---|---|---|---|---|---|---|---|---|---|---|---|---|---|
| $SiO_2$ | 43.8 | 45.8 | 43.8 | 47.3 | 53.3 | 54.3 | 54.7 | 57.0 | 44.0 | 45.5 | 53.6 | 48.6 | 53.1 | 44.9 | 50.5 | 45.5 | 43.5 | 56.0 | 74.8 |
| $Li_2O$ | — | — | — | — | — | 4.0 | — | — | — | — | — | — | 1.5 | — | — | — | — | — | — |
| $Na_2O$ | 4.0 | 2.0 | 7.0 | 4.0 | 3.0 | 4.0 | 4.0 | 5.0 | 8.7 | 3.0 | 7.4 | 5.3 | 2.7 | 5.5 | 6.0 | 5.0 | 4.0 | 6.0 | 7.0 |
| $K_2O$ | 3.0 | 3.0 | 3.0 | 3.0 | 3.0 | 4.0 | 4.0 | 3.0 | 5.9 | 5.8 | — | 5.7 | 5.5 | 3.0 | 3.0 | 2.0 | 2.0 | 5.0 | 1.0 |
| $B_2O_3$ | 6.9 | 8.6 | 7.9 | 8.9 | 8.9 | 4.6 | 10.0 | 6.0 | 4.3 | 4.0 | 3.5 | 4.2 | 8.0 | 16.0 | 13.0 | 19.0 | 22.0 | 12.0 | 6.0 |
| CaO | 15.0 | 15.0 | 16.0 | 16.0 | 8.0 | 6.0 | 6.0 | 6.0 | 4.4 | 16.0 | 14.1 | 13.0 | 8.0 | 16.0 | 11.0 | 13.0 | 12.0 | 12.0 | 10.0 |
| MgO | — | 1.0 | — | — | — | — | — | — | 9.0 | — | — | — | — | — | — | — | — | 0.1 | 0.2 |
| BaO | — | 1.0 | 2.0 | — | — | — | — | — | — | — | 5.3 | — | 5.3 | — | — | — | — | — | — |
| ZnO | 1.0 | — | — | — | 1.0 | 10.0 | — | 1.0 | — | — | — | — | 2.4 | 2.0 | 2.0 | 1.0 | 2.0 | 2.0 | — |
| SrO | — | — | — | 2.0 | — | — | — | — | — | — | — | — | — | — | — | — | — | — | — |
| $TiO_2$ | 14.0 | 10.0 | 16.0 | 12.5 | — | 7.5 | 10.0 | 8.0 | 12.5 | 24.0 | 3.0 | 11.0 | 10.0 | 7.0 | 4.0 | 7.0 | 5.0 | — | — |
| $ZrO_2$ | 7.0 | 10.0 | 3.0 | — | 12.5 | 5.0 | 5.0 | 10.0 | 5.8 | — | 11.0 | 7.0 | 3.0 | — | 5.0 | 5.0 | 5.0 | — | — |
| $Al_2O_3$ | 5.0 | 3.0 | 1.0 | 6.0 | 10.0 | — | 6.0 | 3.3 | 4.8 | — | — | 4.7 | — | 5.0 | 4.0 | 2.0 | 3.0 | 6.0 | 0.1 |
| $P_2O_5$ | — | — | — | — | — | — | — | — | — | 1.0 | 1.5 | — | — | — | 1.0 | — | 1.0 | 0.5 | 0.5 |
| $SO_3$ | 0.3 | 0.6 | 0.3 | 0.3 | 0.3 | 0.6 | 0.3 | 0.7 | 0.6 | 0.7 | 0.6 | 0.5 | 0.5 | 0.6 | 0.5 | 0.5 | 0.5 | 0.4 | 0.4 |
| Leached Alkali Amount (mg) | 0.08 | 0.07 | 0.10 | 0.08 | 0.07 | 0.11 | 0.07 | 0.07 | 0.12 | 0.08 | 0.05 | 0.09 | 0.08 | 0.10 | 0.09 | 0.13 | 0.10 | 0.22 | 0.41 |
| Young's Modulus (GPa) | 90 | 87 | 84 | 79 | 82 | 81 | 81 | 80 | 81 | 77 | 81 | 82 | 80 | 83 | 80 | 79 | 80 | 70 | 68 |

Glass bubbles of a glass composition according to the present invention are produced in the conventional production manner as described bellow. A glass batch is prepared which includes glass materials such as silica, alumina, and other materials, and blowing agent such as salt cake. The glass batch is melted at 1300° C. for two hours to obtain a glass plate. The glass plate contains $SO_3$ generated from decomposition of the salt cake. Then, the glass plate is ground into glass particles and the glass particles are classified to obtain a glass powder having particles sizes of 53 micrometers or less. The glass powder is again heated at 1400° C. and then put into is expanded by $SO_2$ gas generated from $SO_3$ to form a glass bubble and the glass bubble floats on the water. Then, glass bubbles floating on the water are collected.

What is claimed is:

1. Glass bubbles having diameters of 1–130 μm and wall thickness of 0.5–10 μm and consisting essentially of, by weight percentage, $SiO_2$ 42–58%, $R_2O$ 3–16%, $R_2O$ being at least one metal oxide selected from the group consisting of $Li_2O$, $Na_2O$, and $K_2O$; $B_2O_3$ 3.5–23%; RO 6–22%, RO being at least one metal oxide selected from the group consisting of CaO, MgO, BaO, ZnO, and SrO; $RO_2$ 7–26%, $RO_2$ being at least one metal oxide selected from the group consisting of $TiO_2$ and $ZrO_2$; $Al_2O_3$ 0–13%; $P_2O_5$ 0–2%; and $SO_3$ 0.2–0.8%.

2. Glass bubbles as claimed in claim 1, wherein $RO_2$ is 10–26% by weight.

* * * * *